US011888722B2

(12) United States Patent
Zhao (10) Patent No.: US 11,888,722 B2
(45) Date of Patent: Jan. 30, 2024

(54) ROUTE ADVERTISEMENT METHOD, DEVICE, AND SYSTEM

(71) Applicant: Huawei Technologies Co., Ltd., Shenzhen (CN)

(72) Inventor: Jingjing Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 410 days.

(21) Appl. No.: 17/367,003

(22) Filed: Jul. 2, 2021

(65) Prior Publication Data
US 2021/0336866 A1  Oct. 28, 2021

Related U.S. Application Data

(63) Continuation of application No. PCT/CN2019/070691, filed on Jan. 7, 2019.

(51) Int. Cl.
*H04L 12/751* (2013.01)
*H04L 12/741* (2013.01)
(Continued)

(52) U.S. Cl.
CPC .............. *H04L 45/02* (2013.01); *H04L 45/74* (2013.01)

(58) Field of Classification Search
CPC ....... H04L 45/02; H04L 45/04; H04L 45/033; H04L 45/745; H04L 45/125; H04L 45/12;
(Continued)

(56) References Cited

U.S. PATENT DOCUMENTS 7,369,556 B1 * 5/2008 Rekhter ................ H04L 12/465
370/410
9,106,530 B1 8/2015 Wang
(Continued)

FOREIGN PATENT DOCUMENTS

CN      101155118 A     4/2008
CN      101667968 A     3/2010
(Continued)

OTHER PUBLICATIONS

Y. Rekhter, Ed. et al., "A Border Gateway Protocol 4 (BGP-4)," RFC 4271, Jan. 2006, 104 pages.
(Continued)

*Primary Examiner* — Rasheed Gidado
(74) *Attorney, Agent, or Firm* — Conley Rose, P.C.

(57) ABSTRACT

A route advertisement method is applied to a network in which a cross-domain end-to-end tunnel carries a service. The cross-domain end-to-end tunnel crosses at least two Interior Gateway Protocol (IGP) network domains, and the at least two IGP network domains include a first network device, a second network device, and a third network device. The route advertisement method includes receiving, by the first network device, Border Gateway Protocol (BGP) service routing information from the second network device, where the BGP service routing information includes a destination address and a next-hop address to the destination address, skipping, by the first network device, performing route recursion on the next-hop address, and advertising, by the first network device, the BGP service routing information to the third network device.

20 Claims, 7 Drawing Sheets

(51) Int. Cl.
*H04L 45/02* (2022.01)
*H04L 45/74* (2022.01)

(58) Field of Classification Search
CPC ....... H04L 45/22; H04L 45/05; H04L 45/021; H04L 45/58; H04L 45/54
See application file for complete search history.

(56) References Cited

U.S. PATENT DOCUMENTS

| | | | |
|---|---|---|---|
| 10,171,338 B2* | 1/2019 | Filsfils | H04L 45/033 |
| 2005/0243839 A1* | 11/2005 | Raut | H04L 45/04 370/395.54 |
| 2007/0112975 A1* | 5/2007 | Cassar | H04L 12/4633 709/239 |
| 2010/0008361 A1 | 1/2010 | Guichard et al. | |
| 2015/0263952 A1 | 9/2015 | Ganichev et al. | |
| 2015/0304206 A1 | 10/2015 | Filsfils et al. | |
| 2015/0304306 A1* | 10/2015 | Ponsford | H04L 63/045 713/193 |
| 2018/0227212 A1* | 8/2018 | Ferguson | H04L 45/122 |

FOREIGN PATENT DOCUMENTS

| | | |
|---|---|---|
| CN | 101867503 A | 10/2010 |
| CN | 102594657 A | 7/2012 |
| CN | 103973459 A | 8/2014 |
| CN | 105049350 A | 11/2015 |
| CN | 106878177 A | 6/2017 |
| CN | 108259205 A | 7/2018 |

OTHER PUBLICATIONS

S. Sangli et al., "BGP Extended Communities Attribute," RFC 4360, Feb. 2006, 12 pages.

* cited by examiner

ROUTE ADVERTISEMENT METHOD, DEVICE, AND SYSTEM

CROSS-REFERENCE TO RELATED APPLICATIONS

This is a continuation of International Patent Application No. PCT/CN2019/070691 filed on Jan. 7, 2019, which is hereby incorporated by reference in its entirety.

TECHNICAL FIELD

This application relates to the communications field, and in particular, to a route advertisement method, a device, and a system.

BACKGROUND

With the continuous evolution of network technologies, it is possible to build an end-to-end tunnel across a plurality of network domains. For example, in a software-defined networking (SDN) architecture based on an idea of control and forwarding separation, a centralized control and management device (for example, an SDN controller) may collect and manage network topologies of a plurality of Interior Gateway Protocol (IGP) network domains in a centralized manner, and compute an end-to-end tunnel across a plurality of IGP network domains. Various services may be carried on the end-to-end tunnel. For example, a virtual private network (VPN) service may be carried on an end-to-end segment routing-traffic engineering (SR-TE) tunnel. For another example, a service that supports the Internet Protocol version 6 (IPv6) may be carried on an end-to-end tunnel that supports the Internet Protocol version 4 (IPv4), to implement an IPv6 network over an IPv4 network (that is, IPv6 over IPv4).

However, in a scenario in which a service is carried on the end-to-end tunnel, when service routing information (for example, VPN routing information or IPv6 routing information) is advertised according to the Border Gateway Protocol (BGP), a problem that a service cannot be created exists.

SUMMARY

Embodiments of the present disclosure provide a route advertisement method, a device, and a system, to resolve a problem that a service cannot be created when BGP service routing information is advertised in a scenario in which a service is carried on a cross-domain end-to-end tunnel.

According to a first aspect, an embodiment of this application provides a route advertisement method. The method is applied to a network in which a cross-domain end-to-end tunnel carries a service, the cross-domain end-to-end tunnel crosses at least two IGP network domains, and the at least two IGP network domains include a first network device, a second network device, and a third network device. According to the method, the first network device receives BGP service routing information from the second network device, where the BGP service routing information includes a destination address and a next-hop address to the destination address; the first network device does not perform route recursion on the next-hop address before advertising the BGP service routing information to the third network device; and the first network device sends the BGP service routing information to the third network device.

2

After receiving the BGP service routing information from an upstream network device, a non-border network device (the first network device) in the cross-domain network does not perform route recursion on the next-hop address before continuing to advertise the BGP service routing information to a downstream network device. This facilitates service creation.

In a possible design, before the first network device receives BGP service routing information from the second network device, the method further includes: the first network device obtains first policy information, where the first policy information indicates the first network device not to perform route recursion.

A function (or a capability) of enabling (or activating), based on a user requirement, the network device not to perform route recursion is provided by using the first policy information. This helps manage or use a network on demand, and improve flexibility of network management.

In a possible design, that the first network device does not perform route recursion on the next-hop address includes: the first network device does not perform route recursion on the next-hop address according to the indication of the first policy information.

The network device determines, according to the indication of the first policy information, not to perform route recursion. This helps manage a network on demand, and improve flexibility of network management.

In a possible design, the first policy information further includes specified address information, the specified address information indicates an address set, and correspondingly, the first policy information indicates the first network device not to perform route recursion on the BGP service routing information whose destination address is in the address set.

The first policy information includes the specified address information, so that route recursion may not be performed on a BGP route within a specific address range, thereby enriching technique implementation means and improving flexibility of use.

In a possible design, that the first network device does not perform route recursion on the next-hop address includes: when the first network device determines that the destination address is in the address set, the first network device does not perform route recursion on the next-hop address according to the indication of the first policy information.

The network device determines, according to the indication of the first policy information, not to perform route recursion on the next-hop address that satisfies a requirement. This helps manage a network on demand, and improve flexibility of network management.

In a possible design, that the first network device obtains the first policy information includes at least one of the following manners: the first network device obtains the first policy information according to a command line configuration; the first network device receives a first message from a control and management device, where the first message includes the first policy information; and the first network device runs algorithm software to automatically generate the first policy information.

A plurality of manners of obtaining the first policy information are provided, so that technique implementation means are enriched, and usability is improved.

In a possible design, the method further includes: when advertising the BGP service routing information to the third network device, the first network device does not change the next-hop address in the BGP service routing information.

The next-hop address in the BGP service routing information is not changed, so that service creation reliability is improved.

In a possible design, before the first network device advertises the BGP service routing information to the third network device, the method further includes: the first network device obtains second policy information, where the second policy information indicates the first network device not to change the next-hop address in the BGP service routing information when the first network device advertises the BGP service routing information to the third network device.

A function (or a capability) of enabling (or activating), based on a user requirement, the network device not to change the next-hop address in the BGP service routing information is provided by using the second policy information. This helps manage or use a network on demand, and improve flexibility of network management.

In a possible design, that the first network device does not change the next-hop address in the BGP service routing information when advertising the BGP service routing information to the third network device includes: when the first network device advertises the BGP service routing information to the third network device, the first network device does not change the next-hop address in the BGP service routing information according to the second policy information.

The network device determines, according to the indication of the second policy information, not to change the next-hop address in the BGP service routing information. This helps manage a network on demand, and improve flexibility of network management.

In a possible design, that the first network device obtains the second policy information includes at least one of the following manners: the first network device obtains the second policy information according to a command line configuration; the first network device receives a second message from a control and management device, where the second message includes the second policy information; and the first network device runs algorithm software to automatically generate the second policy information.

A plurality of manners of obtaining the second policy information are provided, so that technique implementation means are enriched, and usability is improved.

In a possible design, the BGP service routing information includes BGP VPN routing information, BGP IPv6 routing information, or IPv4 routing information.

By using BGP routing information to carry VPN routing information, IPv6 routing information, or IPv4 routing information, a VPN service, an IPv4 over IPv6 service, or an IPv6 over IPv4 service can be carried on the cross-domain end-to-end tunnel.

According to a second aspect, an embodiment of this application provides a route advertisement method, applied to a network in which a cross-domain end-to-end tunnel carries a service. The cross-domain end-to-end tunnel crosses at least two interior gateway protocol IGP network domains, and the at least two IGP network domains include a first network device, a second network device, and a third network device. According to the method, a control and management device sends a first message to the first network device, where the first message includes first policy information, and the first policy information indicates the first network device not to perform route recursion.

A function (or a capability) of enabling (or activating), based on a user requirement, the network device not to perform route recursion is provided by using the first policy information. This helps manage or use a network on demand, and improve flexibility of network management.

In a possible design, the first policy information further includes specified address information, the specified address information indicates an address set, and correspondingly, the first policy information indicates the first network device not to perform route recursion on BGP service routing information whose destination address is in the address set.

The network device determines, according to the indication of the first policy information, not to perform route recursion on a next-hop address that satisfies a requirement. This helps manage a network on demand, and improve flexibility of network management.

In a possible design, the control and management device sends a second message to the first network device, where the second message includes second policy information, and the second policy information indicates the first network device not to change the next-hop address in the BGP service routing information when the first network device advertises the BGP service routing information to the third network device.

A function (or a capability) of enabling (or activating), based on a user requirement, the network device not to change the next-hop address in the BGP service routing information is provided by using the second policy information. This helps manage or use a network on demand, and improve flexibility of network management.

In a possible design, the BGP service routing information includes BGP VPN routing information, BGP IPv6 routing information, or IPv4 routing information.

By using BGP routing information to carry VPN routing information, IPv6 routing information, or IPv4 routing information, a VPN service, an IPv4 over IPv6 service, or an IPv6 over IPv4 service can be carried on the cross-domain end-to-end tunnel.

According to a third aspect, an embodiment of this application provides a network device, used as a first network device. The first network device includes a memory and a processor connected to the memory. The processor is configured to execute a computer-readable instruction in the memory, to perform the method in any one of the first aspect or the possible implementations of the first aspect.

According to a fourth aspect, the present disclosure provides a computer-readable medium, including an instruction. When the instruction is run on a computer, the computer is enabled to perform the method in any one of the first aspect or the possible implementations of the first aspect.

According to a fifth aspect, an embodiment of this application provides a control and management device. The control and management device includes a memory and a processor connected to the memory. The processor is configured to execute a computer-readable instruction in the memory, to perform the method in any one of the second aspect or the possible implementations of the second aspect.

According to a sixth aspect, the present disclosure provides a computer-readable medium, including an instruction. When the instruction is run on a computer, the computer is enabled to perform the method in any one of the second aspect or the possible implementations of the second aspect.

According to a seventh aspect, the present disclosure provides a system. The system includes the first network device according to the third aspect or the fourth aspect and the control and management device according to the fifth aspect or the sixth aspect.

BRIEF DESCRIPTION OF DRAWINGS

To describe the technical solutions in the embodiments of this application more clearly, the following briefly introduces the accompanying drawings for describing the embodiments or other approaches. It is clear that the accompanying drawings in the following description show merely some embodiments recorded in this application, and a person of ordinary skill in the art may still derive other drawings from these accompanying drawings.

DESCRIPTION OF EMBODIMENTS

In order to enable a person skilled in the art to better understand the solutions in the present disclosure, the following describes the embodiments of the present disclosure in more detail with reference to accompanying drawings and implementations. It is clear that the described embodiments are some rather than all of the embodiments of the present disclosure. All other embodiments obtained by a person of ordinary skill in the art based on the embodiments of the present disclosure without creative efforts shall fall within the protection scope of the present disclosure.

Before the technical solutions of the embodiments of the present disclosure are described, an application scenario of the embodiments of the present disclosure is first illustrated. The present disclosure is applied to a network in which a cross-domain end-to-end tunnel carries a service. The cross-domain end-to-end tunnel is a tunnel that crosses at least two IGP network domains. The cross-domain end-to-end tunnel is a complete tunnel instead of a segmented tunnel formed by splicing a plurality of tunnels in separate network domains (a tunnel in a single network domain is a tunnel that crosses only one network domain). The cross-domain end-to-end tunnel is a tunnel including two end nodes and at least one intermediate node, and a node may also be referred to as a network device. The cross-domain end-to-end tunnel may be a bidirectional tunnel between the two end nodes, or may be a bidirectional tunnel including two unidirectional tunnels in opposite directions. For example, a unidirectional tunnel 1 from an end node A to an end node B and a unidirectional tunnel 2 from the end node B to the end node A form a bidirectional tunnel between the end node A and the end node B. The IGP network domain is a network on which routing information is exchanged according to IGP, and is also referred to as an IGP domain. A network including the at least two IGP network domains is also referred to as a cross-domain network. Usually, one autonomous system (AS) is one IGP network domain. However, sometimes, one AS has a relatively large scale, and because performance of a network device is insufficient to support route calculation in such a large-scale network, or to facilitate maintenance and management, an operator divides the AS into a plurality of IGP network domains, to adapt to the performance of the network device or satisfy a management requirement.

It should be noted that the cross-domain end-to-end tunnel may be in a form of an SR-TE tunnel, a segment routing-best effort (SR-BE) tunnel, a resource reservation protocol-traffic engineering (RSVP-TE) tunnel, a multi-protocol label switching (MPLS) label switched path (LSP) tunnel, a generic routing encapsulation (GRE) tunnel, an IPv4 tunnel (for example, in an IPv6 over IPv4 scenario), an IPv6 tunnel (for example, in an IPv4 over IPv6 scenario), or the like. Only an example is provided herein, and this is not limited. In addition, the end-to-end tunnel may be established by using a centralized control and management device, or may be established in another manner.

The cross-domain network includes a plurality of network devices. The network device is a device that performs a routing and forwarding function, and may be a device such as a router, a switch, or a forwarder. The router, the switch, or the forwarder may be a physical device, or may be a virtual device (such as a virtual server, a virtual router, a virtual switch, or a virtual forwarder) implemented based on a virtualization technology. In the cross-domain network, a network device connected to a device in a service network (for example, a service network 1 and a service network 2 shown in FIG. 1 in the following) is also referred to as a border network device, and a network device not connected to a device in the service network is also referred to as a non-border network device.

Figure 1:
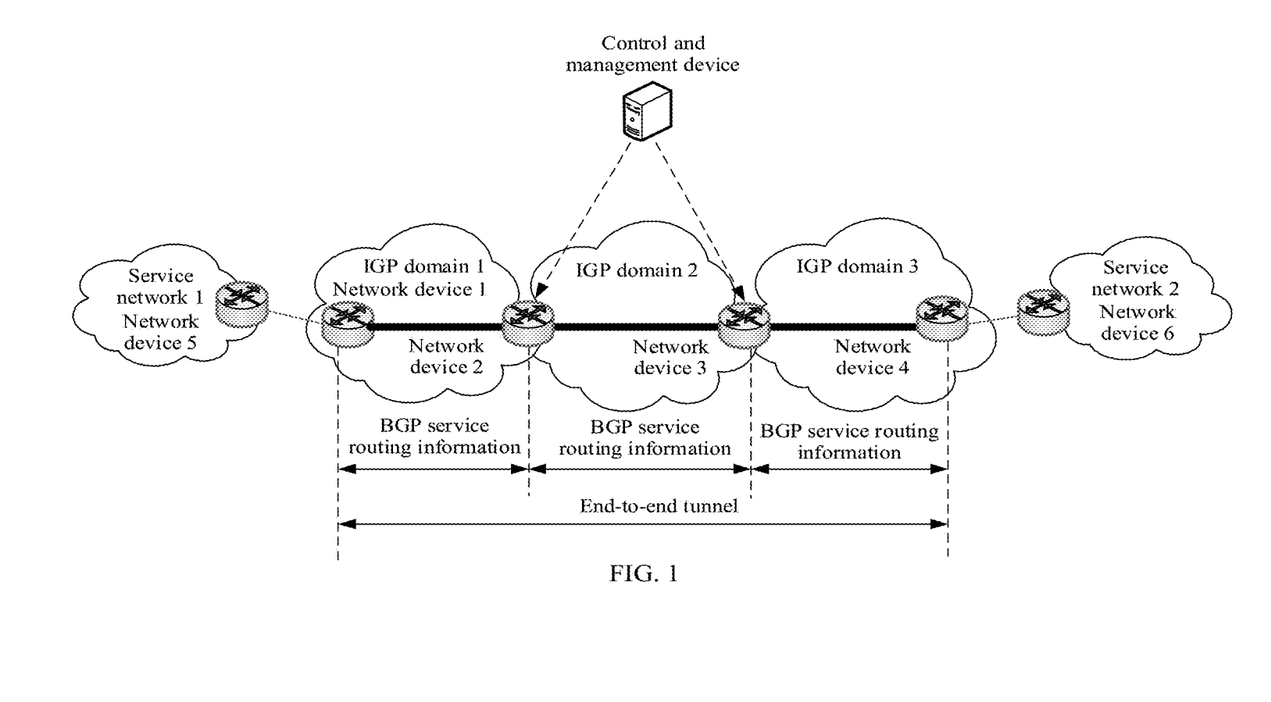
FIG. 1 is a schematic diagram of an application scenario in which an end-to-end tunnel carries a service according to an embodiment of this application.

FIG. 1 is a schematic diagram of an application scenario in which a cross-domain end-to-end tunnel carries a service. The schematic diagram includes three IGP network domains: an IGP domain 1, an IGP domain 2, and an IGP domain 3. The IGP domain 1 includes a network device 1 and a network device 2, the IGP domain 2 includes the network device 2 and a network device 3, and the IGP domain 3 includes the network device 3 and a network device 4. The network device 2 is connected to the IGP domain 1 and the IGP domain 2, and the network device 3 is connected to the IGP domain 2 and the IGP domain 3. A control and management device performs centralized control, and establishes an end-to-end tunnel crossing the three IGP domains between the network device 1 and the network device 4. A service between a service network 1 and a service network 2 may be carried on the end-to-end tunnel. The end-to-end tunnel is also referred to as a public network tunnel or an outer tunnel. BGP peers are respectively established between the network device 1 and the network device 2, between the network device 2 and the network device 3, and between the network device 3 and the network device 4, and BGP service routing information is advertised between the BGP peers through a BGP update message, to implement service creation. In a direction in which the network device 1 advertises a BGP service route to the network device 4, a previous node is referred to as an upstream node of a following node, and the following node is referred to as a downstream node of the previous node. For example, the network device 2 is a downstream node of the network device 1, and the network device 1 is an upstream node of the network device 2. The BGP service routing information includes a destination address and a next-hop address. For example, the destination address may be carried in a multiprotocol reachable NLRI (MP_REACH_NLRI) attribute defined by BGP, and the next-hop address may be carried in a NEXT_HOP attribute defined by BGP. For details about the MP_REACH_NLRI attribute and the NEXT_HOP attribute, refer to the request for comments (RFC) 4271 released by the Internet Engineering Task Force (IETF). Content of this document and parts related to this aspect seem to be copied as a whole, and are incorporated by reference (incorporated by reference) into this specification. For a description of a contradiction or conflict that the document has with this application, a description of this application shall prevail. In this specification, for brevity, details are not described herein. The service may be a VPN service, an IPv6 service, or the like. If the service is the VPN service, the service network 1 and the service network 2 are two site networks of a VPN, and the service routing information is VPN routing information. In this case, the destination address is a private network address of the VPN, for example, may be a VPN-IPv4 address, a VPN-IPv6 address, or a media access control (MAC) address in an Ethernet VPN (EVPN). If the service is the IPv6 service, the service network 1 and the service network 2 are IPv6 networks, and the service routing information is IPv6 routing information. In this way, an IPv6 over IPv4 network is implemented. When the service routing information is the IPv6 routing information, the destination address is an IPv6 address. It should be noted that, if the destination address is an IP address (including an IPv4 address and an IPv6 address), the destination address is also referred to as an IP address prefix or an IP prefix.

The embodiments of the present disclosure provide a method. In an application scenario in which a cross-domain end-to-end tunnel carries a service, after receiving BGP service routing information (including a destination address and a next-hop address to the destination address) from an upstream network device, before continuing to advertise the BGP service routing information to a downstream network device, a non-border network device in a cross-domain network does not perform route recursion on the next-hop address and does not change the next-hop address.

It should be noted that, route recursion refers to recursive route lookup, and is specifically an operation of performing recursive route lookup for an Internet Protocol (IP) address in a NEXT_HOP attribute. Recursive route lookup includes recursive IP lookup and recursive tunnel lookup. When a network device receives BGP routing information, if an IP address in a NEXT_HOP attribute is a next-hop address that is not directly to the network device, recursive route lookup needs to be performed on IP addresses in the NEXT_HOP attribute to determine a direct next-hop address (that is, recursive IP lookup) or tunnel identifier (that is, recursive tunnel lookup), so as to determine whether a route to the IP address in the NEXT_HOP attribute is reachable.

The method in the embodiments of the present disclosure helps normally create a service in the network scenario in which a cross-domain end-to-end tunnel carries a service, thereby avoiding a problem that if route recursion fails when a network device performs route recursion on a next-hop address before the network device advertises BGP service routing information, advertisement (that is, distribution) of the BGP service routing information is terminated, and consequently, a service cannot be normally created.

The foregoing describes the application scenario of the embodiments of the present disclosure, and the following further describes the embodiments of the present disclosure in detail based on the application scenario in FIG. 1. The following first network device is a network device not connected to a device in a service network, that is, a non-border network device, in at least two IGP network domains in which a cross-domain end-to-end tunnel is located. For example, the first network device may be the network device 2 or the network device 3 in FIG. 1, a route reflector (RR) 1 or an RR 2 in the following FIG. 3A, an autonomous system border router (Autonomous System Border Router, ASBR) 1, an ASBR 2, an ASBR 3, an ASBR 4, an ASBR 5, an ASBR 6, an ASBR 7, or an ASBR 8 in the following FIG. 3B, or a router 2, a router 3, or a router 4 in the following FIG. 3C.

Figure 2:
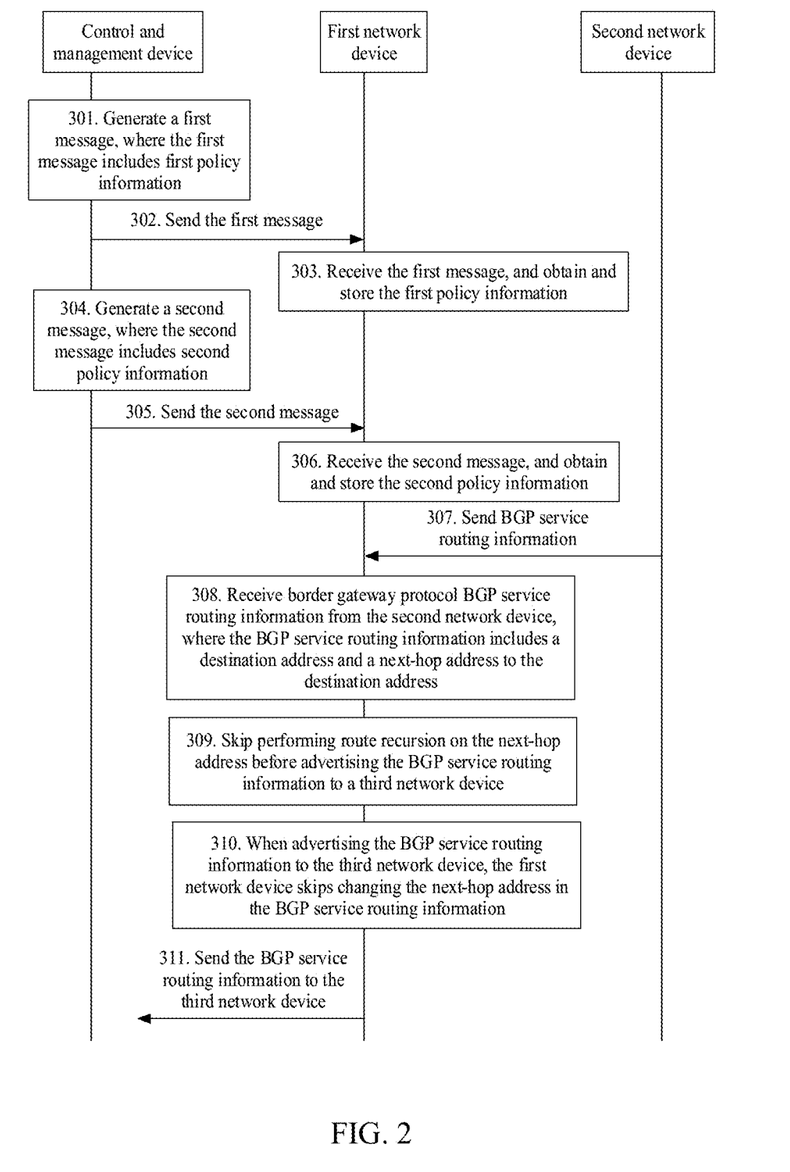
FIG. 2 is an interaction flowchart of a route advertisement method according to an embodiment of this application.

FIG. 2 is a schematic flowchart of a route advertisement method according to an embodiment of the present disclosure. The method includes the following content.

301. A control and management device generates a first message, where the first message includes first policy information, and the first policy information indicates the first network device not to perform route recursion.

302. The control and management device sends the first message to the first network device.

303. The first network device receives the first message. The first network device obtains the first policy information from the first message and stores the first policy information.

FIG. 1 is used as an example. A network device 1 receives BGP service routing information sent by a network device 5, where the BGP service routing information includes a destination address (for example, an IP address 50.1.1.1/32 in a service network 1) and a next-hop address (for example, an IP address of the network device 5). The network device 1 updates the next-hop address to an IP address of the network device 1 (for example, the IP address of the network device 1 is 10.1.1.1/32), and continues to send the BGP service routing information to a network device 2, a network device 3, and a network device 4 in sequence. When the first network device is the network device 2, a third network device is the network device 3, and the first policy information indicates the network device 2 not to perform route recursion on the next-hop address. Likewise, when the first network device is the network device 3, the third network device is the network device 4, and the first policy information indicates the network device 3 not to perform route recursion on the next-hop address.

A function (or a capability) of enabling (or activating), based on a user requirement, the network device not to perform route recursion is provided by using the first policy information. This helps manage or use a network on demand, and improve flexibility of network management.

In a specific implementation, the first policy information further includes specified address information, the specified address information indicates an address set, and correspondingly, the first policy information indicates the first network device not to perform route recursion on a next-hop address in BGP service routing information whose destination address is in the address set.

FIG. 1 is used as an example. The destination address in the BGP service routing information is 50.1.1.1/32, and the next-hop address is the IP address of the network device 1, for example, 10.1.1.1/32. If the address set is {50.1.1.1/32, 60.1.1.1/32 . . . }, the destination address is in the address set. Therefore, when the first network device is the network device 2, and the third network device is the network device 3, the first policy information indicates the network device 2 not to perform route recursion on the next-hop address in the BGP service routing information. Likewise, when the first network device is the network device 3, and the third network device is the network device 4, the first policy information indicates the network device 3 not to perform route recursion on the next-hop address in the BGP service routing information.

The first policy information includes the specified address information, so that route recursion may not be performed on a BGP route within a specific address range, thereby enriching technique implementation means and improving flexibility of use.

304. The control and management device generates a second message, where the second message includes second policy information, and the second policy information indicates the first network device not to change the next-hop address in the BGP service routing information when the first network device advertises the BGP service routing information to the third network device.

305. The control and management device sends the second message to the first network device.

306. The first network device receives the second message. The first network device obtains the second policy information from the second message and stores the second policy information.

FIG. 1 is used as an example. When the first network device is the network device 2, the third network device is the network device 3, and the second policy information indicates the network device 2 not to change the next-hop address in the BGP service routing information when the network device 2 advertises the BGP service routing information to the network device 3.

In a specific implementation, the second policy information further includes specified address information, the specified address information indicates an address set, and correspondingly, the second policy information indicates the first network device not to change the next-hop address in the BGP service routing information whose destination address is in the address set. It should be noted that the specified address information included in the second policy information may be the same as or different from the specified address information included in the first policy information. This is not limited herein.

FIG. 1 is used as an example. The destination address in the BGP service routing information is 50.1.1.1/32, and the next-hop address is the IP address of the network device 1, for example, 10.1.1.1/32. If the address set is {50.1.1.1/32, 60.1.1.1/32 . . . }, the destination address is in the address set. Therefore, when the first network device is the network device 2, and the third network device is the network device 3, the second policy information indicates the network device 2 not to change the next-hop address in the BGP service routing information.

The second policy information includes the specified address information, so that the next-hop address in the BGP service routing information may not be changed for a BGP route within a specific address range, thereby enriching technique implementation means and improving flexibility of use.

It should be noted that the control and management device generates the first message and/or the second message and sends the first message and/or the second message to the first network device based on a user requirement. A user is a network operator, administrator, or user. The user requirement may be a requirement for using a network, managing a network, or the like. The user requirement may be manually configured and input on the control and management device, or may be automatically obtained by the control and management device after the control and management device receives a requirement message from another application server (for example, a third-party application server). Alternatively, another manner may be used. This is not limited in this specification.

It should be further noted that the first message and the second message are sent by a same control and management device or different control and management devices. The first policy information and the second policy information may be separately carried in two messages, or may be carried in one message.

It should be further noted that the first message and the second message may be sent according to a management channel protocol, or may be sent according to a control channel protocol. Currently, commonly used management channel protocols may include, for example, the Simple Network Management Protocol (SNMP) and the Network Configuration Protocol (NETCONF). Currently, commonly used control channel protocols may include, for example, the OpenFlow protocol, the Path Computation Element Communication Protocol (PCEP), the BGP, and the Interface to Routing System (I2RS) protocol.

The first message and the second message are sent by a same control and management device or different control and management devices, thereby improving flexibility of solution implementation.

It should be further noted that, other than obtaining the first policy information and the second policy information by receiving a message from the control and management device, the first network device may alternatively obtain the first policy information and the second policy information in at least one of the following manners:

(1) The first network device obtains the first policy information and the second policy information according to a command line configuration. For example, an administrator logs in to the first network device to perform a configuration operation by using a command line.

(2) The first network device runs algorithm software to automatically generate the first policy information and/or the second policy information.

A plurality of manners of obtaining the first policy information and the second policy information are provided, so that technique implementation means are enriched, and usability is improved.

307. A second network device sends the BGP service routing information to the first network device.

308. The first network device receives the border gateway protocol BGP service routing information from the second network device, where the BGP service routing information includes the destination address and the next-hop address to the destination address.

309. The first network device determines, according to the first policy information, not to perform route recursion on the next-hop address before advertising the BGP service routing information to the third network device.

FIG. 1 is used as an example. When the first network device is the network device 2, the second network device is the network device 1, and the third network device is the network device 3, the network device 2 receives the BGP service routing information from the network device 1, and determines, according to the first policy information on the network device 2, not to perform route recursion on the next-hop address (which is the IP address of the network device 1, for example, 10.1.1.1/32). The network device 2 continues to advertise the BGP service routing information to the network device 3. Alternatively, when the first network device is the network device 3, the second network device is the network device 2, and the third network device is the network device 4. After receiving the BGP service routing message from the network device 2, the network device 3 continues to determine, according to the first policy information on the network device 3, not to perform route recursion on the next-hop address (the IP address of the network device 1), and then continues to advertise the BGP service routing information to the network device 4.

Route recursion is not performed on the next-hop address. This avoids a problem that continuous advertisement or dissemination of the BGP service routing information is terminated due to a route recursion failure, and consequently, a service cannot be created.

In a specific implementation, when the first policy information further includes the specified address information, and the specified address information indicates the address set, the first network device further needs to determine whether the destination address is a destination address in the address set. When the first network device determines that the destination address is a destination address in the address set, the first network device does not perform route recursion on the next-hop address.

FIG. 1 is used as an example. If the destination address in the BGP service routing information is 50.1.1.1/32, and the address set is {50.1.1.1/32, 60.1.1.1/32 . . . }, the destination address is in the address set. The network device 2 receives the BGP service routing information from the network device 1, and determines, according to the first policy information on the network device 2, that the destination address (50.1.1.1/32) is in the address set. Therefore, the network device 2 does not perform route recursion on the next-hop address (the IP address of the network device 1). The network device 2 continues to advertise the BGP service routing message to the network device 3. After receiving the BGP service routing message from the network device 2, the network device 3 continues to determine, according to the first policy information on the network device 3, that the destination address (50.1.1.1/32) is in the address set. Therefore, the network device 3 does not perform route recursion on the next-hop address (the IP address of the network device 1), and then continues to advertise the BGP service routing information to the network device 4. On the contrary, if the destination address is 80.1.1.1/32 and is not in the address set, the network device 2 or the network device 3 stops advertising the BGP service routing information.

The first policy information includes the specified address information, so that route recursion may not be performed on a BGP service route within a specific address range, thereby enriching technique implementation means and improving flexibility of use.

310. The first network device does not change the next-hop address in the BGP service routing information according to the indication of the second policy information when the first network device advertises the BGP service routing information to the third network device.

311. Send the BGP service routing information to the third network device.

FIG. 1 is used as an example. The network device 1 sends a BGP service route to the network device 2, and the next-hop address is the IP address (10.1.1.1/32) of the network device 1. The next-hop address in the BGP service routing information received by the network device 2 from the network device 1 is the IP address of the network device 1. When the network device 2 continues to advertise the BGP service routing information to the network device 3, according to the second policy information on the network device 2, the network device 2 does not change the next-hop address to an IP address of the network device 2 (an address of the network device 2), but still uses the address of the network device 1 as the next-hop address. Likewise, the network device 3 does not change the next-hop address according to the second policy information on the network device 3, but still uses the address of the network device 1 as the next-hop address when continuing to advertise the BGP service routing information to the network device 4. The network device 1 is an end node of the cross-domain end-to-end tunnel, and the network device 4 is the other end node of the cross-domain end-to-end tunnel. When receiving the BGP service routing information, the network device 4 may perform route recursion by using the IP address of the network device 1 that is used as the next-hop address, to check whether the cross-domain end-to-end tunnel is reachable. If the cross-domain end-to-end tunnel is reachable, a service can be successfully created through route recursion. If the cross-domain end-to-end tunnel is faulty and unreachable, a service cannot be created through route recursion.

The next-hop address in the BGP service routing information is not changed, so that the next-hop address in the BGP service routing information is always an end node of the cross-domain end-to-end tunnel, and when the BGP service routing information reaches a device (border network device) connected to a service network in a cross-domain network, route recursion may be performed to check reachability of the cross-domain end-to-end tunnel. This ensures that a service is created only when the cross-domain end-to-end tunnel is reachable, thereby improving service creation reliability.

Further, as described in the foregoing 307 to 309, route recursion is not performed on a non-border network device in the cross-domain network, to avoid a problem that when an end node of the cross-domain end-to-end tunnel is used as a next hop to perform route recursion, service route advertisement is terminated due to a recursion failure, and consequently, a service cannot be created. For example, if the network device 3 in FIG. 1 performs IP recursion by using the address of the network device 1 as the next-hop address, a routing entry corresponding to the address of the network device 1 that is a destination address cannot be found. A reason is that the network device 1 is a device in the IGP domain 1, routing of the network device 1 is only in a range of the IGP domain 1 and is only in a routing table of the IGP domain 1, and there is no routing to the network device 1 in the IGP domain 2, that is, there is no routing entry corresponding to the address of the network device 1 in a routing table of the IGP domain 2. When the network device 3 performs tunnel recursion by using the address of the network device 1 as the next-hop address, because the network device 3 is an intermediate node on the cross-domain end-to-end tunnel, recursion to the cross-domain end-to-end tunnel cannot be implemented. To be specific, in a tunnel forwarding table, a tunnel identifier corresponding to the address (the next-hop address) of the network device 1 cannot be found. Therefore, the route recursion performed by the network device 3 cannot succeed.

Figure 3A:
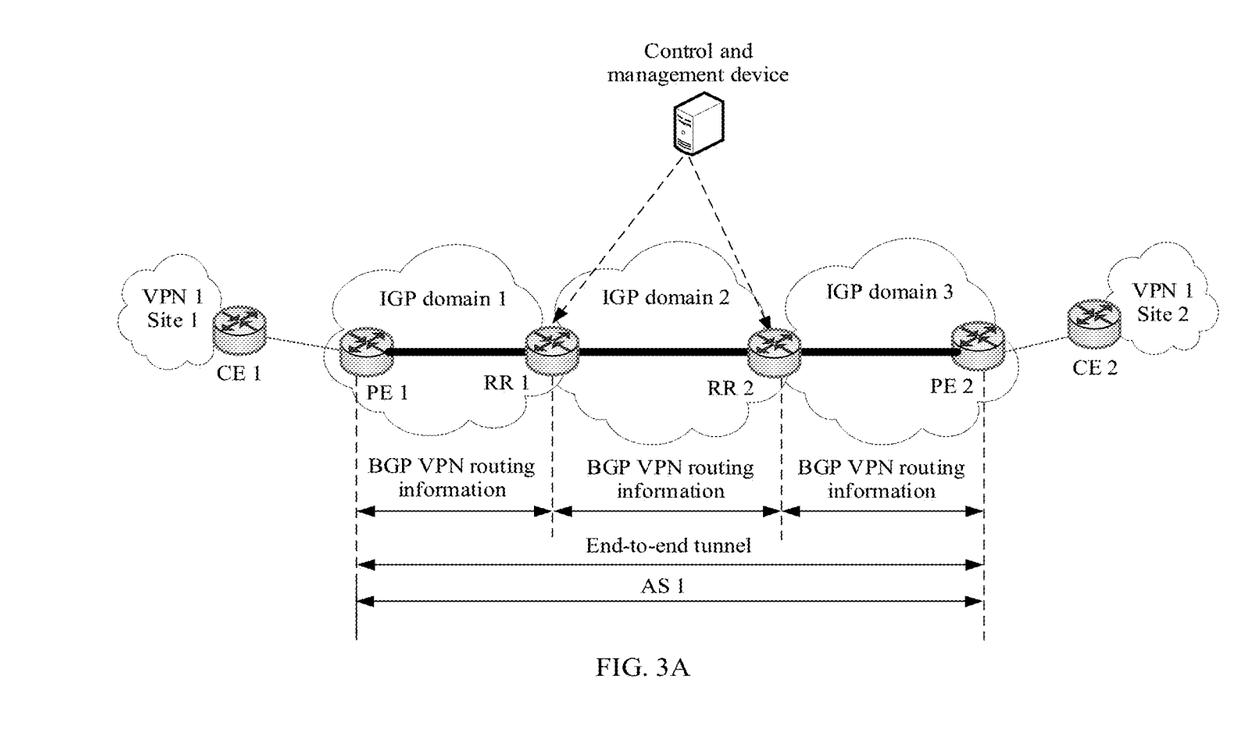
FIG. 3A is a schematic diagram of an application scenario in which an end-to-end tunnel carries a VPN service according to an embodiment of this application.
Figure 3B:
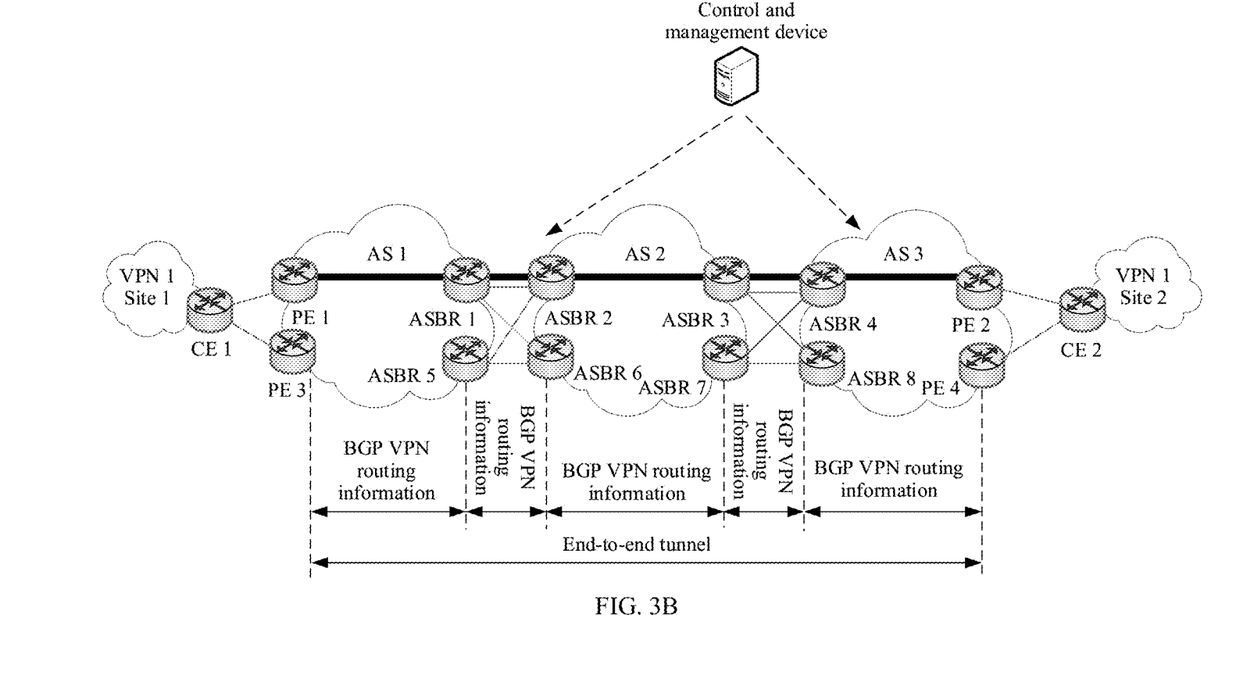
FIG. 3B is a schematic diagram of another application scenario in which an end-to-end tunnel carries a VPN service according to an embodiment of this application.
Figure 3C:
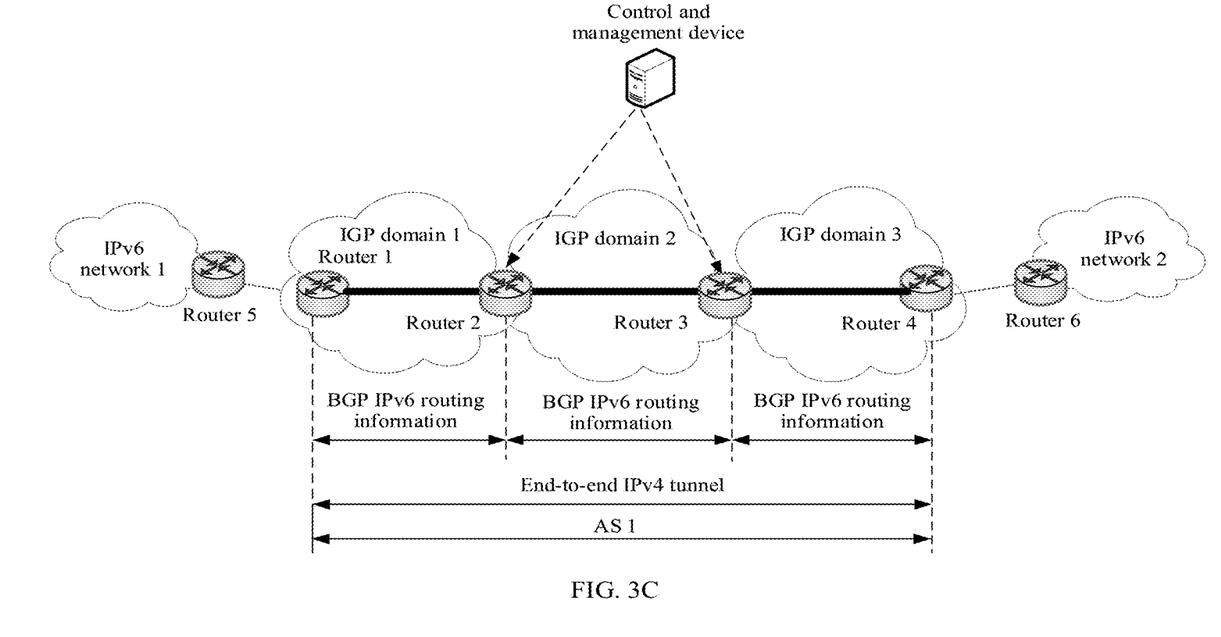
FIG. 3C is a schematic diagram of an application scenario in which an end-to-end tunnel carries an IPv6 service according to an embodiment of this application.

To clearer understand specific application scenarios in which a cross-domain end-to-end tunnel carries various services, the following FIG. 3A to FIG. 3C show specific application scenarios in which a VPN service and an IPv6 service are carried. The following further explains and describes the embodiments of the present disclosure with reference to specific application scenarios.

FIG. 3A is a schematic diagram of an application scenario in which a cross-domain end-to-end tunnel carries a VPN service. In this scenario, one AS includes three IGP network domains, and a VPN site accesses a network of the AS by using a customer edge (CE) device (the CE device is referred to as a CE for short below). A control and management device performs centralized control, and establishes an end-to-end tunnel crossing the three IGP network domains between provider edge (PE) devices (the PE device is referred to as a PE for short below) to carry a VPN service. For example, an SR-TE tunnel (a public network tunnel) is established between a PE 1 and a PE 2, a CE 1 and a CE 2 are respectively located in a site 1 and a site 2 of a VPN 1, and a service of the VPN 1 may be carried between the site 1 and the site 2 by using the SR-TE tunnel. BGP peers are respectively established between the PE 1 and an RR 1, between the RR 1 and an RR 2, and between the RR 2 and the PE 2. VPN routing information of the CE 1 and the CE 2 is advertised and disseminated between the BGP peers of the PE 1, the RR 1, the RR 2, and the PE 2 by using BGP update messages. Therefore, a VPN private tunnel (namely, an inner tunnel) is established over the public network tunnel (namely, an outer tunnel) between the PE 1 and the PE 2, so that VPN 1 service interworking between the site 1 and the site 2 in different regions is implemented.

A method implemented in the VPN service scenario shown in FIG. 3A in the present disclosure is consistent with that in FIG. 1, and a difference lies in that advertised BGP service routing information is specifically a private network route in the VPN 1. As non-border network devices in the cross-domain network, the RR 1 and the RR 2 are preset to avoiding performing route recursion or updating a next-hop address. As a border network device in the cross-domain network, the PE 1 needs to update a next hop to the PE 1 when advertising BGP VPN routing information. As a border network device in the cross-domain network, the PE 2 needs to perform route recursion when receiving the BGP VPN routing information, to ensure that a cross-domain end-to-end tunnel, obtained through recursion, from the PE 2 to the PE 1 is reachable. In this way, it can be ensured that the BGP VPN routing information advertised by the PE 1 can be normally disseminated to the PE 2 through the RR 1 and the RR 2, and that the end-to-end tunnel from the PE 2 to the PE 1 is reachable. Then, a VPN 1 service is created. This facilitates reliable creation of the VPN 1 service.

FIG. 3B is a schematic diagram of another application scenario in which a cross-domain end-to-end tunnel carries a VPN service. This scenario is similar to that in FIG. 3A. A difference lies in that this scenario includes three ASs, and the ASs are interconnected through ASBRs. Each AS is an IGP network domain, and ASs may also be considered as an IGP network domain. A control and management device performs centralized control, and establishes an end-to-end tunnel crossing the three ASs between PEs to carry a VPN service. For example, an RSVP-TE tunnel (public network tunnel) is established between a PE 1 and a PE 2. A service of a VPN 1 may be carried between a site 1 and a site 2 by using the RSVP-TE tunnel. A CE 1 accesses the PE 1 and a PE 3 in an AS 1, and a CE 2 accesses the PE 2 and a PE 4 in an AS 3. The PE 1 and the PE 3 respectively establish BGP peers with an ASBR 1 and an ASBR 5; the ASBR 1 and the ASBR 5 respectively establish BGP peers with an ASBR 3 and an ASBR 7; the ASBR 3 and the ASBR 7 respectively establish BGP peers with an ASBR 4 and an ASBR 8; and the ASBR 4 and the ASBR 8 respectively establish BGP peers with the PE 2 and the PE 4. VPN routing (also referred to as private network routing) information between the site 1 and the site 2 is carried in a BGP update message, and is advertised and disseminated through the BGP peers in sequence. Therefore, a VPN private tunnel (namely, an inner tunnel) is established over the public network tunnel (namely, an outer tunnel) between the PE 1 and the PE 2, so that VPN 1 service interworking between the site 1 and the site 2 in different regions is implemented. It should be noted that, similar to a case that a CE may access a PE in a dual-homing mode, to ensure reliability, a plurality of cross-domain end-to-end tunnels may be established between each of the PE 1 and the PE 3 and each of the PE 2 and the PE 4. Only one tunnel is used as an example herein, but no limitation is imposed.

A method implemented in the VPN service scenario shown in FIG. 3B in the present disclosure is consistent with that in FIG. 1 or FIG. 3A, but is applied to a scenario of crossing a plurality of AS domains. For details, refer to the foregoing related parts. For brevity, details are not described again.

FIG. 3C is a schematic diagram of an application scenario in which a cross-domain end-to-end tunnel carries an IPv6 service. In this scenario, one AS includes three IGP network domains, and the three IGP network domains are IPv4-based networks. An IPv6 network 1 and an IPv6 network 2 access a network of the AS. A router 5 and a router 6 are respectively located in the IPv6 network 1 and the IPv6 network 2. A control and management device performs centralized control, and establishes an end-to-end IPv4 tunnel crossing the three IGP network domains between a router 1 and a router 4 to carry an IPv6 service. BGP peers are respectively established between the router 1 and a router 2, between the router 2 and a router 3, and between the router 3 and the router 4. IPv6 routing information of the IPv6 network 1 and the IPv6 network 2 is advertised and disseminated between the BGP peers of the router 1, the router 2, the router 3, and the router 4 by using BGP update messages. In this way, an IPv6 tunnel (namely, an inner tunnel) is established over the IPv4 tunnel (namely, an outer tunnel) between the router 1 and the router 4, so that interworking between the IPv6 network 1 and the IPv6 network 2 is implemented.

A method implemented in the IPv6 service scenario shown in FIG. 3C in the present disclosure is consistent with that in FIG. 1, and a difference lies in that advertised BGP service routing information is specifically an IPv6 address in an IPv6 network, and a tunnel for route recursion is a cross-domain end-to-end IPv4 tunnel. As non-border network devices in the cross-domain network, the router 2 and the router 3 are preset to avoiding performing route recursion or updating a next-hop address. As a border network device in the cross-domain network, the router 1 needs to update a next hop to the router 1 when advertising BGP IPv6 routing information. As a border network device in the cross-domain network, the router 4 needs to perform route recursion when receiving the BGP IPv6 routing information, to ensure that a cross-domain end-to-end tunnel, obtained through recursion, from the router 4 to the router 1 is reachable. This can ensure that the BGP IPv6 routing information advertised by the router 1 can be normally disseminated to the router 4 through the router 2 and the router 3, and that the end-to-end tunnel from the router 4 to the router 1 is reachable. Then, an IPv6 over IPv4 service is created. This facilitates reliable creation of the IPv6 over IPv4 service.

It should be noted that an IPv6 over IPv4 service scenario is used as an example in FIG. 3C. An IPv4 over IPv6 service is similar, and a difference lies in that a cross-domain tunnel is an IPv6 tunnel, and advertised BGP service routing information is IPv4 routing information. For brevity, details are not described again.

Figure 4:
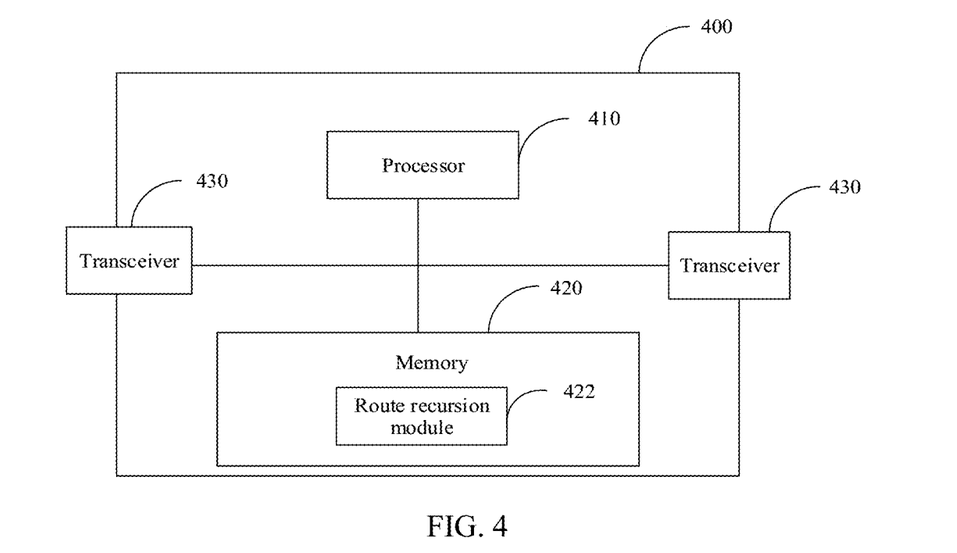
FIG. 4 is a schematic diagram of a network device according to an embodiment of this application.

FIG. 4 is a schematic diagram of a network device according to an embodiment of this application. The network device 400 is used as a first network device, and is used in a network in which a cross-domain end-to-end tunnel carries a service. The cross-domain end-to-end tunnel crosses at least two IGP network domains, and the at least two IGP network domains include the first network device, a second network device, and a third network device. The first network device includes a processor 410, a memory 420 coupled to the processor 410, and a transceiver 430. The processor 410 may be a central processing unit (CPU), a network processor (NP), or a combination of a CPU and an NP. The processor may alternatively be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 410 may be one processor, or may include a plurality of processors. The transceiver 430 is configured to receive border gateway protocol BGP service routing information from the second network device, and send the packet to the processor 410, for subsequent operation processing. The BGP service routing information includes a destination address and a next-hop address to the destination address. The memory 420 may include a volatile memory, for example, a random-access memory (RAM). Alternatively, the memory may include a non-volatile memory, for example, a read-only memory (ROM), a flash memory, a hard disk drive (HDD), or a solid-state drive (SSD). Alternatively, the memory may include a combination of the foregoing types of memories. The memory 420 stores a computer-readable instruction. The computer-readable instruction includes a software module, for example, a route recursion module 422. After executing each software module, the processor 410 may perform a corresponding operation according to an indication of each software module. In this embodiment, an operation performed by a software module is actually an operation performed by the processor 410 according to an indication of the software module. The route recursion module 422 may be configured to perform route recursion on the next-hop address. However, in this embodiment, before advertising the BGP service routing information to the third network device, the processor 410 does not perform route recursion on the next-hop address by using the route recursion module 422. In addition, after executing the computer-readable instruction in the memory 420, the processor 410 may perform, according to an indication of the computer-readable instruction, all operations that can be performed by the first network device, for example, operations performed by the first network device in the embodiments corresponding to FIG. 1, FIG. 2, FIG. 3A, FIG. 3B, and FIG. 3C.

Figure 5:
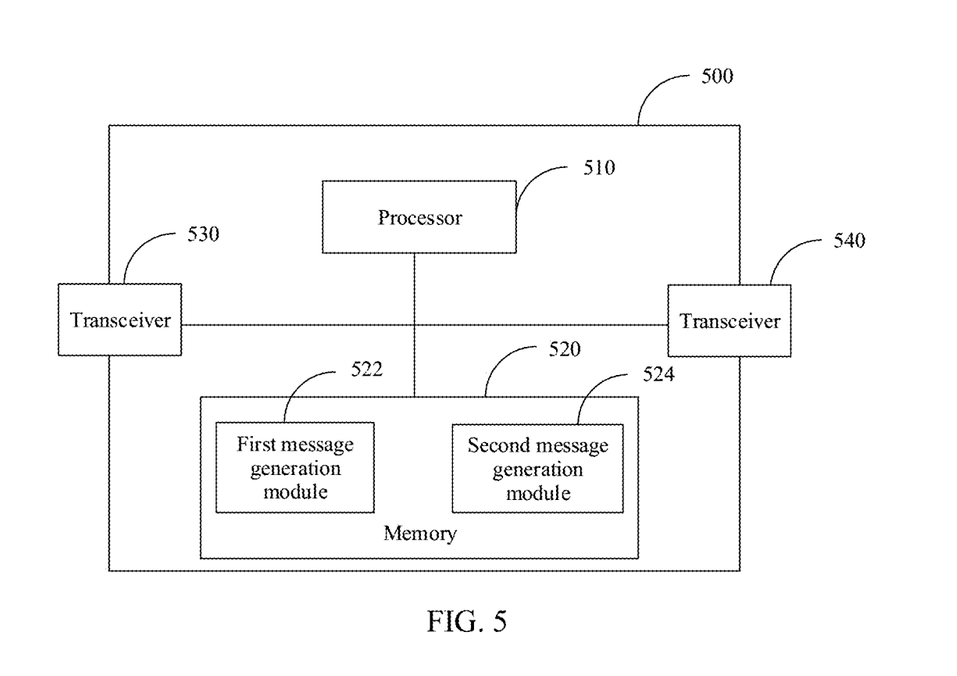
FIG. 5 is a schematic diagram of a control and management device according to an embodiment of this application.

FIG. 5 is a schematic diagram of a control and management device 500 according to an embodiment of this application.

As shown in FIG. 5, the control and management device 500 includes a processor 510, a memory 520 coupled to the processor 510, and a transceiver 530. The control and management device 500 may be the control and management device in FIG. 1, FIG. 2, and FIGS. 3A-3C. The processor 510 may be a CPU, an NP, or a combination of a CPU and an NP. The processor may alternatively be an ASIC, a PLD, or a combination thereof. The PLD may be a CPLD, an FPGA, GAL, or any combination thereof. The processor 510 may be one processor, or may include a plurality of processors. The memory 520 may include a volatile memory, for example, a RAM. Alternatively, the memory may include a non-volatile memory, for example, a ROM, a flash memory, an HDD, or an SSD. Alternatively, the memory may include a combination of the foregoing types of memories. The memory 520 stores a computer-readable instruction, and the computer-readable instruction includes a plurality of software modules, for example, a first message generation module 522 and a second message generation module 524. After executing each software module, the processor 510 may perform a corresponding operation according to an indication of each software module. In this embodiment, an operation performed by a software module is actually an operation performed by the processor 510 according to an indication of the software module. The first message generation module 522 is configured to generate a first message, where the first message includes first policy information, and the first policy information indicates a first network device not to perform route recursion. The second message generation module 524 is configured to generate a second message, where the second message includes second policy information, and the second policy information indicates the first network device not to change the next-hop address in the BGP service routing information when the first network device advertises the BGP service routing information to the third network device. The transceiver 530 is configured to send the first message and the second message to the first network device. Specifically, when the computer-readable instruction includes the first message generation module 522, the transceiver 530 is configured to send the first message to the first network device. When the computer-readable instruction includes the second message generation module 524, the transceiver 530 is configured to send the second message to the first network device according to an indication of the processor 510. When the computer-readable instruction includes the first message generation module 522 and the second message generation module 524, the transceiver 530 is configured to send the first message and the second message to the first network device according to an indication of the processor 510. In addition, after executing the computer-readable instruction in the memory 520, the processor 510 may perform, according to an indication of the computer-readable instruction, all operations that can be performed by the control and management device, for example, operations performed by the control and management device in the embodiments corresponding to FIG. 1, FIG. 2, FIG. 3A, FIG. 3B, and FIG. 3C.

Figure 6:
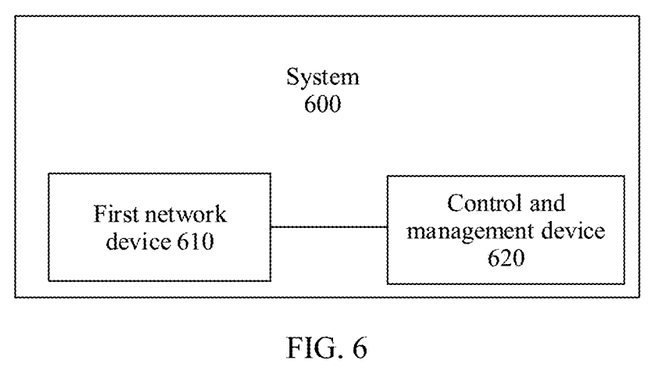
FIG. 6 is a schematic diagram of a system according to an embodiment of this application.

FIG. 6 is a schematic diagram of a route advertisement system according to an embodiment of the present disclosure. As shown in FIG. 6, the system 600 includes a network device 610 and a control and management device 620. The network device 610 is the first network device described in the embodiments corresponding to FIG. 1, FIG. 2, FIG. 3A, FIG. 3B, and FIG. 3C, and the control and management device 620 is the control and management device described in the embodiments corresponding to FIG. 1, FIG. 2, FIG. 3A, FIG. 3B, and FIG. 3C. For detailed descriptions of the devices in the system, refer to related parts in the embodiments corresponding to FIG. 1, FIG. 2, FIG. 3A, FIG. 3B, and FIG. 3C. Details are not described herein again.

It should be noted that in the embodiments of the present disclosure, "first" in the first network device, "second" in the second network device, and "third" in the third network device are merely used to distinguish between the three network devices, but do not indicate that there is a sequence relationship, a hierarchy relationship, or another dependency relationship among the three network devices.

It should be understood that a person skilled in the art can obtain, on a basis of reading this application, combinations of optional features, steps, or methods described in the embodiments of this application without creative efforts, and all of the combinations belong to embodiments disclosed in this application. For simple description or writing, different combinations are not described.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

The foregoing descriptions are merely example specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A route advertisement method implemented by a first network device in a network, wherein the route advertisement method comprises:
   receiving Border Gateway Protocol (BGP) service routing information from a second network device in the network, wherein the BGP service routing information comprises a destination address and a next-hop address to the destination address, wherein a cross-domain end-to-end tunnel carries a service in the network, wherein the cross-domain end-to-end tunnel crosses at least two Interior Gateway Protocol (IGP) network domains, and wherein the at least two IGP network domains comprise the first network device, the second network device, and a third network device;
   skipping performing route recursion on the next-hop address before advertising the BGP service routing information to the third network device; and
   advertising the BGP service routing information to the third network device.

2. The route advertisement method of claim 1, wherein before receiving the BGP service routing information from the second network device, the route advertisement method further comprises obtaining first policy information, and wherein the first policy information comprises an indication that the first network device is not to perform the route recursion.

3. The route advertisement method of claim 2, further comprising skipping, according to the indication, performing the route recursion on the next-hop address.

4. The route advertisement method of claim 2, wherein the first policy information further comprises specified address information with an address set that instructs the first network device not to perform the route recursion on the BGP service routing information whose destination address is in the address set.

5. The route advertisement method of claim 4, further comprising skipping, according to the indication, performing the route recursion on the next-hop address when the first network device determines that the destination address is in the address set.

6. The route advertisement method of claim 2, further comprising at least one of:

obtaining the first policy information according to a command line configuration;
receiving a first message from a control and management device, wherein the first message comprises the first policy information; or
running algorithm software to automatically generate the first policy information.

7. The route advertisement method of claim 1, further comprising skipping changing the next-hop address in the BGP service routing information when advertising the BGP service routing information to the third network device.

8. The route advertisement method of claim 7, wherein before advertising the BGP service routing information to the third network device, the route advertisement method further comprises obtaining second policy information, and wherein the second policy information comprises a second indication that the first network device is not to change the next-hop address in the BGP service routing information when the first network device advertises the BGP service routing information to the third network device.

9. The route advertisement method of claim 8, further comprising skipping, according to the second policy information, changing the next-hop address in the BGP service routing information when advertising the BGP service routing information to the third network device.

10. A route advertisement method implemented by a control and management device, wherein the route advertisement method comprises:
    generating a first message comprising first policy information, wherein the first policy information comprises an indication to a first network device in a network to not perform route recursion, wherein a cross-domain end-to-end tunnel carries a service in the network, wherein the cross-domain end-to-end tunnel crosses at least two Interior Gateway Protocol (IGP) network domains, and wherein the at least two IGP network domains comprise the first network device, a second network device, and a third network device; and
    advertising the first message to the first network device.

11. The route advertising method of claim 10, wherein the first policy information further comprises specified address information with an address set that instructs the first network device not to perform the route recursion on Border Gateway Protocol (BGP) service routing information whose destination address is in the address set.

12. The routing advertising method of claim 10, further comprising advertising a second message to the first network device, wherein the second message comprises second policy information, and wherein the second policy information comprises a second indication that the first network device is not to change a next-hop address in a Border Gateway Protocol (BGP) service routing information when the first network device advertises the BGP service routing information to the third network device.

13. A first network device, comprising:
    a memory configured to store instructions; and
    a processor coupled to the memory and configured to execute the instructions to cause the first network device to be configured to:
    receive Border Gateway Protocol (BGP) service routing information from a second network device in a network, wherein the BGP service routing information comprises a destination address and a next-hop address to the destination address, wherein a cross-domain end-to-end tunnel carries a service in the network, wherein the cross-domain end-to-end tunnel crosses at least two Interior Gateway Protocol (IGP) network domains, and wherein the at least two IGP network domains comprise the first network device, the second network device, and a third network device;

skip performing route recursion on the next-hop address; and advertise the BGP service routing information to the third network device.

14. The first network device of claim 13, wherein the instructions further cause the first network device to be configured to obtain first policy information, and wherein the first policy information comprises an indication that the first network device is not to perform the route recursion.

15. The first network device of claim 14, wherein the instructions further cause the first network device to be configured to not perform the route recursion on the next-hop address according to the indication of the first policy information.

16. The first network device of claim 14, wherein the first policy information further comprises specified address information with an address set that instructs the first network device not to perform the route recursion on the BGP service routing information whose destination address is in the address set.

17. The first network device of claim 16, wherein the instructions further cause the first network device to be configured to not perform the route recursion on the next-hop address according to the indication of the first policy information when the first network device determines that the destination address is in the address set.

18. A control and management device, comprising:
a memory configured to store instructions; and
a processor coupled to the memory and configured to execute the instructions to cause the control and management device to be configured to:

generate a first message comprising first policy information, wherein the first policy information comprises an indication to a first network device in a network to not perform route recursion, wherein a cross-domain end-to-end tunnel carries a service in the network, wherein the cross-domain end-to-end tunnel crosses at least two Interior Gateway Protocol (IGP) network domains, and wherein the at least two IGP network domains comprise the first network device, a second network device, and a third network device; and advertise the first message to the first network device.

19. The control and management device of claim 18, wherein the first policy information further comprises specified address information with an address set that instructs the first network device not to perform the route recursion on Border Gateway Protocol (BGP) service routing information whose destination address is in the address set.

20. The control and management device of claim 18, wherein the instructions further cause the control and management device to be configured to advertise a second message to the first network device, wherein the second message comprises second policy information, and wherein the second policy information indicates that the first network device is not to change a next-hop address in Border Gateway Protocol (BGP) service routing information when the first network device advertises the BGP service routing information to the third network device.

* * * * *